Sept. 28, 1926.  W. E. NAUGLER  1,601,223
FLEXIBLE COUPLING
Filed Jan. 11, 1921
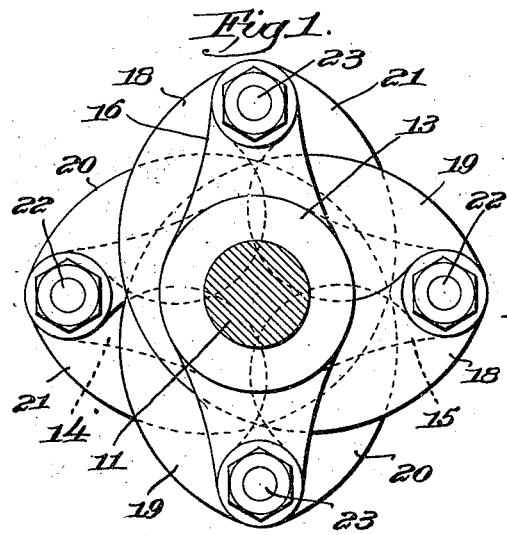
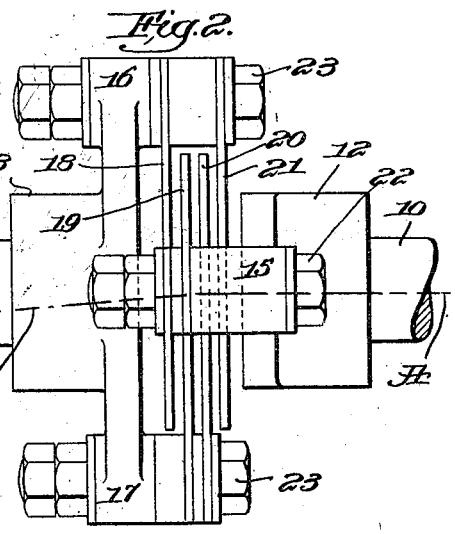
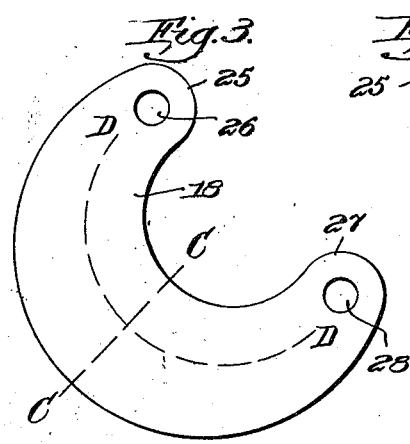
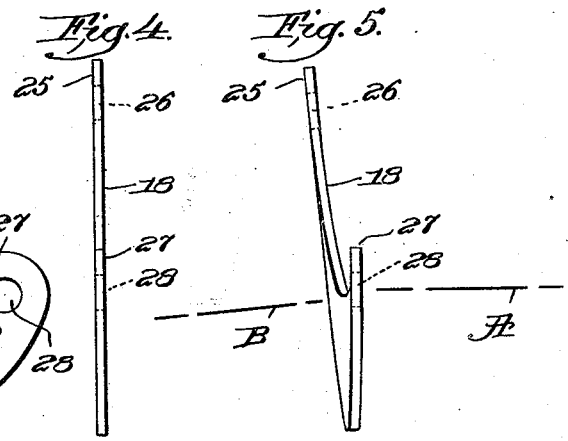
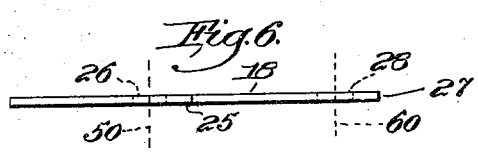
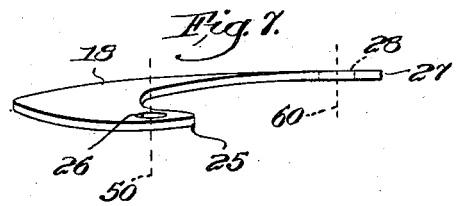
Inventor,
Walter E. Naugler,
by Edward H. Allen
his Atty.

Patented Sept. 28, 1926.

1,601,223

UNITED STATES PATENT OFFICE.

WALTER E. NAUGLER, OF BOSTON, MASSACHUSETTS.

FLEXIBLE COUPLING.

Application filed January 11, 1921. Serial No. 436,408.

This invention relates to flexible couplings for shafting and more particularly to shafting wherein one shaft to be coupled is angularly disposed to its coacting shaft, as is common in motor driven vehicles and the like.

An object of this invention is to produce a flexible coupling that is simple in construction and composed of the minimum number of parts consistent with the result to be obtained.

A further object of the invention is to produce a coupling of this class that is so constructed and arranged as to require no lubrication to maintain it in operating condition.

A still further object of this invention is to provide a coupling with flexible power transmitting members that will yield to variations in the angular relations of two shafts in such manner that the said members will not stretch, or tend to become elongated, but will twist in such a way that the secured ends of the said members may be moved relatively each with the other, in parallel paths an appreciable distance greatly in excess of the amount ordinarily required to compensate for the angular relations of coupled shafting.

A further object of this invention is to so construct and arrange the flexible members that the center of their weight coincides, or approximately so, with the axes of the shafting coupled, and therefore the securing bolts are released from strain that would otherwise be imposed upon them.

It is a further object of the invention to so devise a coupling that it may, if necessary, be repaired on the road, referring more particularly to the power transmitting members, and not require the services of an expert repair-man.

Furthermore, end play of the shafts may occur which will be cared for by the flexibility of the power transmitting members.

To the attainment of the above objects the invention consists in certain novel features of construction and arrangement of parts which will be fully understood by reference to the description of the drawings, and to the claims hereinafter given.

Of the drawings:

Figure 1 is a face view of the present invention in its preferred form.

Figure 2 is an elevation looking toward the left Figure 1.

Figure 3 is a detail of one of the flexible members shown in Figure 1 in its normal condition.

Figure 4 an edge view of Figure 3 looking toward the left.

Figure 5 a view similar to Figure 4, illustrating the position that the flexible member would at times assume when used in coupling two angularly disposed shafts.

Figure 6 a top plan view of Figure 3.

Figure 7 a view similar to Figure 3 illustrating the member under the same conditions as Figure 5.

Referring to the drawings:

For the purpose of explanation 10 is or may be a drive shaft from some suitable source of power such as an internal combustion engine common to motor vehicles; 11 a driven shaft; 12—13 are enlarged heads fixedly secured to the shafts 10—11 respectively. Said heads having arms 14—15—16—17 radiating therefrom the arms 16—17 of the head 13 being arranged perpendicularly to the arms 14—15 of the head 12, as readily seen in Figures 1 and 2 of the drawings.

The several arms at the ends thereof are provided with holes to receive bolts which are adapted to firmly secure the flexible power transmitting members in place.

In order to couple the two shafts 10—11 together so that they may assume, if need be, angularly relative positions, as indicated by dotted lines A and B, Figures 2 and 5 flexible members 18—19—20 and 21 are employed. One end of each of the flexible members is rigidly connected to one of the arms 14—15 of the head 12 while the other end is rigidly secured to one of the arms 16—17 of the head 13 by the bolts 22—23 respectively.

The order of assembling these members is not material but that shown in Figure 2 is a convenient disposition thereof suitable for the use intended.

Figure 3 shows a detail of one of the members 18 detached and in its normal condition, attention being called to its crescent-like shape and to the fact that greater width is given to the member at approximately the line C—C than at any other part thereof.

In Figure 5 the same member in edge view is shown as it would appear when the shaft 11 assumes an angle to the shaft 10 as would be the case in the generality of motor driven vehicles.

Figure 7 illustrates the same member in plane view in the condition shown in Figure 5 and clearly shows the line of travel of the end 25 having the hole 26 relatively to the end 27 having the hole 28. It is an object of this invention to provide flexible power transmitting members that will not stretch or tend to stretch as would straight-edged links if used in place of the present members; in fact straight-edged links as shown in numerous existing patents could not be used in place thereof and permit angular relative positions of the shafts 10—11.

The shape of the flexible members is such as to enable the ends thereof to be moved relatively back and forth across and approximately at right angles to their normal plane, in paths parallel to said shafts, for a considerable distance. It will be readily seen that movement of either of the ends 25—26 as just described, would cause a peculiar, yet even and graceful, twist to the member 18 throughout nearly its entire length or for approximately the distance indicated by the median line D. D. Figure 3, and it is due to the disposition of the stock in the body of the member 18 that the member may be flexed the required amount and still maintain the required distance between the centres of the holes 26—28. In other words, the member 18 will not be stretched but will twist to such extent and in such manner as to compensate for slightly increased distance between the centers of the holes 26—28 as the relative angularity of the shafts 10—11 demand, as will be readily seen by reference to Figures 6 and 7. The dotted lines 50 and 60 in said figures clearly indicating the centers of the holes 26 and 28 and the fact that the distance between said center lines does not change when the member is flexed.

It is likewise an object of this invention to eliminate as much as possible the detrimental effects of centrifugal action and in this instance the novel shape of the flexible members is such that the centers of the weight (or gravity) of the members coincides with the center line or axes of the shafts or approximately so, and therefore being so disposed the bolts 22—23 will be subjected to the strains arising from the transmission of power and flexing of the power transmitting members only.

It is also an object of this invention to provide power transmitting members with the maximum convenient length of body of the member along the median line thereof, for the minimum distance between the secured ends thereof.

The crescent-like shape of the members accomplishes this object, and in so doing the secured ends as 25—27 may be moved relatively, as before explained, a considerable distance while the body of the member as a whole, will partake of a twist which is distributed along the length of the body, or approximately the median line thereof, and consequently the tendency to breakage or even crystallization of the member is practically eliminated.

It has been found that the slight twist that the member undergoes in the ordinary use thereof does not detract from its strength for transmission purposes, as the twist is very slight and the members are reinforced as at C—C to offset any weakening tendency that might exist.

It is obvious that various changes might be made in the disposition of the members and in the shape thereof without departing from the spirit and scope of this invention; therefore it is not the intention to limit this invention to the precise construction and arrangement herein shown and described, but rather it is the intention to claim broadly the flexible nonstretchable members secured to separate power transmitting mediums.

Having described the invention, I claim:

1. In a device of the class described, a drive member; a driven member; and flat power transmitting members rigidly secured to said members having bodies, the median lines of the faces of which are longer than the distances between the ends thereof.

2. In a device of the class described, a drive member; a driven member; and flat power transmitting members rigidly secured to said members, of such construction that the median lines of the faces of the bodies thereof are longer than the distance between the securing points thereof.

3. In a device of the class described, a drive member, a driven member; means on said members to which power transmitting members are rigidly secured; and flexible crescent shaped power transmitting members rigidly secured to said means.

4. In a device of the class described, a drive shaft; a driven shaft; arms secured to and radiating from said shafts; flexible crescent shaped power transmitting members adapted to be secured to said arms, one end of each member being rigidly secured to an arm on the drive shaft, the other end being rigidly secured to an arm on the driven shaft; and means to rigidly secure said ends on said arms.

5. In a device of the class described, a drive shaft; a driven shaft; means on said shafts to which power transmitting members are secured; power transmitting members the ends of which are secured to said means and of such construction that the centre of gravity of each of the said members approximately coincides with the axes of the said shafts.

6. In a device of the class described, a drive member; a driven member; and flat flexible non-stretchable power transmitting members the ends of which are rigidly secured to said drive and driven members, and of such construction and arrangement as to twist upon deflection of the drive or driven members whereby the ends of the said transmitting members will maintain their predetermined radial angular relationship.

7. In a device of the class described, a plurality of revoluble members; a plurality of bowed power transmitting connectors the ends of which are rigidly secured to said revoluble members in such manner as to transmit power from one of said members to the other, said connectors being so assembled that the major portion of the bodies thereof is disposed within an imaginary boundary formed by the chords of said bowed connectors.

8. In a device of the class described, a plurality of revoluble members; a plurality of power transmitting connectors therefor the ends of which are secured thereto, of such construction and arrangement that a portion of the body of each connector midway thereof overlaps that of the other connectors.

9. In a flexible coupling of the class described, a drive member, and a driven member; a flexible power transmitting unit intermediate said members including a plurality of flat arcuate sections circularly arranged and normally disposed in parallel spaced relation, each section being rigidly secured at its ends in such manner as to transmit power between the said members, and each being of such arrangement that the portion between the secured ends may be flexed an appreciable amount without injury thereto.

Signed by me at Boston, Mass., this 4th day of December, 1920.

WALTER E. NAUGLER.